No. 714,736. Patented Dec. 2, 1902.
J. A. PEEPELS.
MACHINE FOR CUTTING CIGAR WRAPPERS.
(Application filed Nov. 7, 1901.)
(No Model.) 2 Sheets—Sheet 1.

Witnesses
C. G. Bassler.
C. G. Hensel.

By

Inventor
John A. Peepels.
Wm. R. Gerhart
his Atty.

No. 714,736. Patented Dec. 2, 1902.
J. A. PEEPELS.
MACHINE FOR CUTTING CIGAR WRAPPERS.
(Application filed Nov. 7, 1901.)
(No Model.) 2 Sheets—Sheet 2.
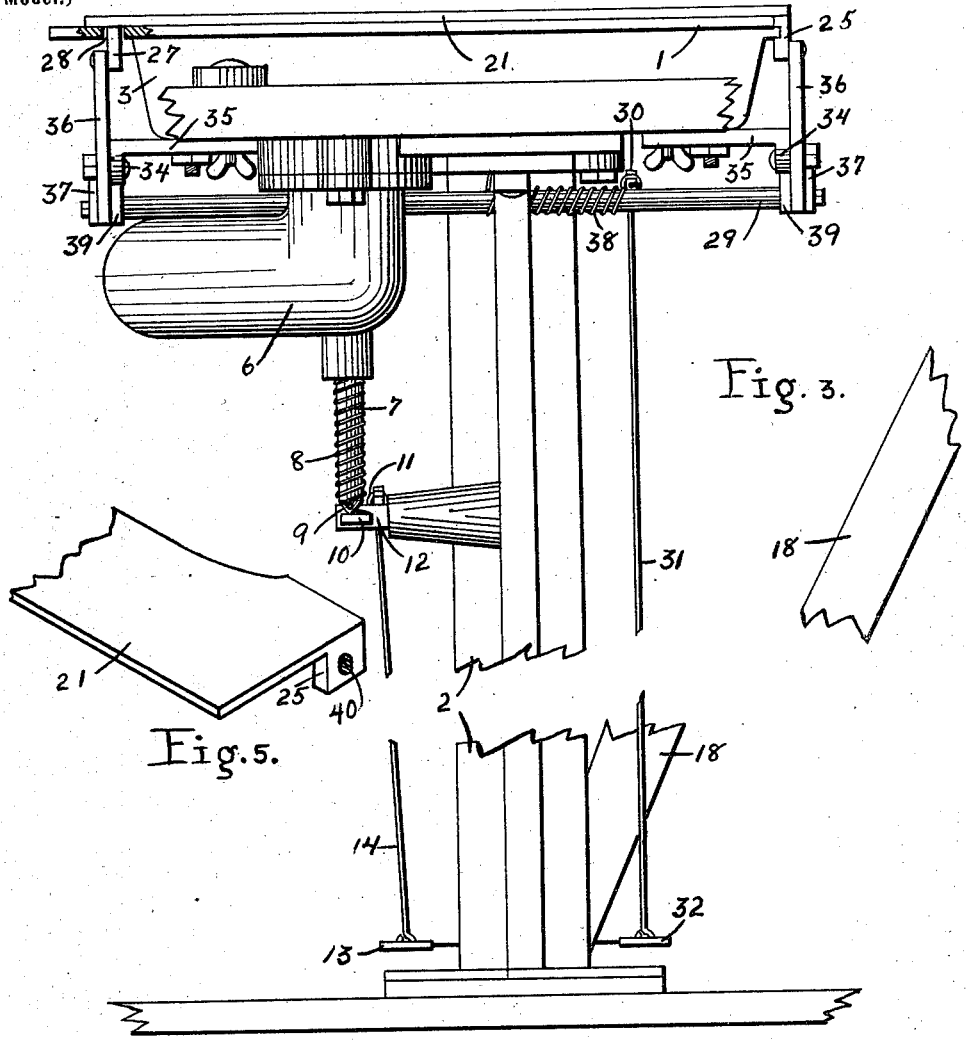
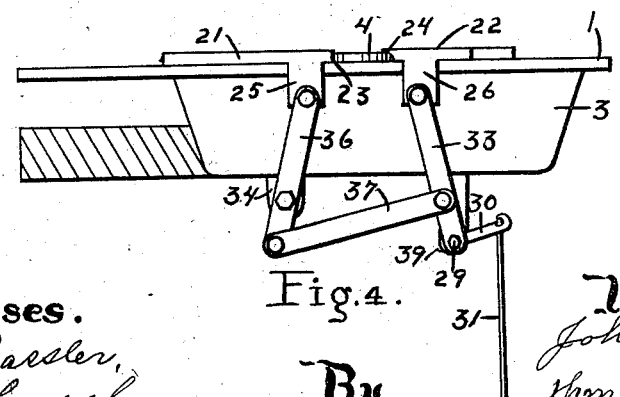
Witnesses.
C. G. Bassler,
C. G. Hensel.
Inventor
John A. Peepels
Wm. R. Gerhard
His Atty.

UNITED STATES PATENT OFFICE.

JOHN A. PEEPELS, OF LANCASTER, PENNSYLVANIA.

MACHINE FOR CUTTING CIGAR-WRAPPERS.

SPECIFICATION forming part of Letters Patent No. 714,736, dated December 2, 1902.

Application filed November 7, 1901. Serial No. 81,491. (No model.)

*To all whom it may concern:*

Be it known that I, JOHN A. PEEPELS, a citizen of the United States, residing at Lancaster, in the county of Lancaster and State of Pennsylvania, have invented certain Improvements in Machines for Cutting Cigar-Wrappers, of which the following is a specification.

This invention relates to machines designed for cutting cigar-wrappers, and it is an improvement on Reissue Patent No. 11,864, dated October 9, 1900, original Patent No. 633,162, dated September 19, 1899, and issued to Peter E. Shirk.

The invention shown and described in Reissue Patent No. 11,864 relates to that class of machines for cutting cigar-wrappers wherein the leaf is held by suction or air-pressure to a diaphragm or platen while the wrapper is cut from said leaf and the bunch is rolled in the wrapper without removing said wrapper from the position occupied thereby when it is cut. There is in said reissue patent a continuous endless cutting-blade of the form of a cigar-wrapper, the cutting edge whereof extends slightly above the bed-plate. In rolling the bunch in the wrapper only the fingers of the operative can be used to avoid cutting or scoring the wrapper on the cutting-blade. Even by the use of the fingers alone it requires great care to prevent such cutting or scoring by the cutting-blade.

The objects of the present improvement are, first, to prevent such cutting or scoring of the wrapper by the cutting-blade, and, second, to enable the operative to use the palm of the hand in rolling the bunch in the wrapper, as is usually done with hand-made cigars. I attain these objects by the mechanism illustrated in the accompanying drawings, forming a part of this specification, and in which—

Figure 1:
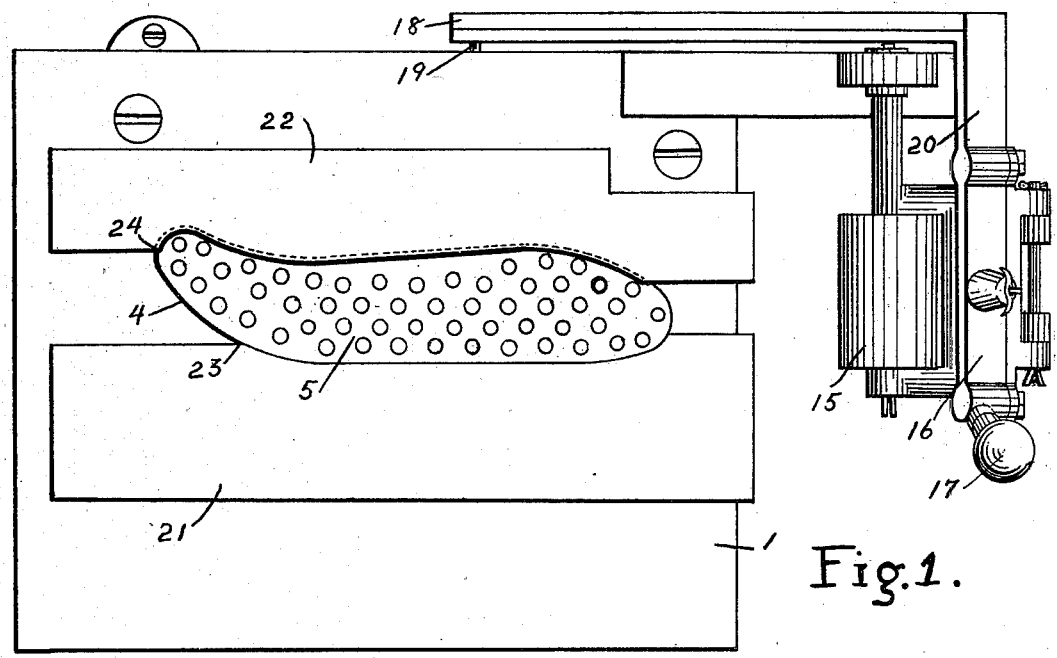
Figure 2:
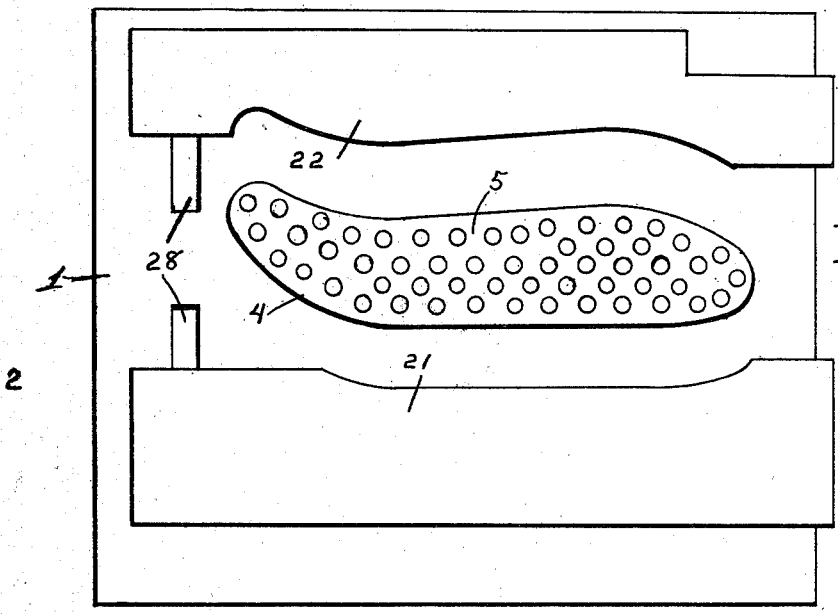

Figure 1 is a top plan view of the operating parts of a table embodying my improvements and upon which is cut the wrappers for cigars, the bearing-plates being closed in on the cutting-blade. Fig. 2 is a similar view, but showing the bearing-plates drawn back from the edges of the cutting-blade to permit said blade to be used. Fig. 3 is a front view of the operating mechanism. Fig. 4 is an end view showing the mechanism whereby the bearing-plates are operated. Fig. 5 is an end perspective view of one of the bearing-plates.

Similar numerals indicate like parts throughout the several views.

In this specification and drawings there is but partially shown and described the exhaust-chamber, the cutting-blade, the perforated diaphragm or platen lying within said cutting-blade, and the pressure-roller and its appurtenances, with the mechanism for operating all the said parts, as said parts and the mechanism for operating the same do not form any part of this invention.

Referring to the details of the drawings, 1 indicates the bed-plate of the machine, adapted to be set in a cigar-maker's bench (not shown) and secured thereto over an opening in said bench.

2 designates a post supporting bed-plate 1; 3, an exhaust-chamber attached to the bottom of said bed-plate, and in said bed-plate is an opening into exhaust-chamber 3 and conforming in shape with a continuous endless cutting-blade 4, set therein and of the configuration of a cigar-wrapper, and the cutting edge of which extends above bed-plate 1, as shown in Fig. 4, and in the space surrounded by cutting-blade 4 is a perforated diaphragm or platen 5, set slightly below the cutting edge of said blade 4 and held in place by yielding supports. (Not shown.)

Beneath and opening into exhaust-chamber 3 is a valve-chamber 6, wherein is a valve, and beneath the seat of said valve valve-chamber 6 is connected with an exhaust-pipe, the valve, valve-seat, the exhaust-pipe, and the connection therewith not being shown. The stem 7 of said valve passes down through the lower part of the valve-chamber, and below the same there is a spring 8 coiled around said stem, the spring having its upper end bearing against the bottom of the valve-chamber and its lower end on a pin 9, passing through the stem. Bearing against the lower end of the valve-stem is the arm 10 of a lever 11, fulcrumed to a bracket 12 of post 2, the arm 10 of said lever being connected with a treadle 13 by a rod or chain 14.

15 is a pressure-roller carried by a bracket 16, having a handle 17, and 18 is a lever having its lower end hinged to a pin 19 on the lower end of post 2 and its upper end attached to an arm 20 of bracket 16. Pressure-roller 15 has a hinge connection with bracket 16, and it is normally depressed by springs. (Not shown.)

In operating, the tobacco-leaf is spread over the platen, the valve in valve-chamber 6 is opened, and as soon as atmospheric pressure is induced on said leaf by means of the exhaust-pipe the operator grasps handle 17 of bracket 16 and pushes the pressure-roller over cutting-blade 4, when, loosening his grasp of handle 17, he takes a bunch and at once proceeds to roll the same in the newly-cut wrapper.

21 and 22 are respectively bearing-plates resting on bed-plate 1 and on the opposite longitudinal sides of cutting-blade 4. These bearing-plates are adapted to be moved toward or from said cutting-blade, and they are of somewhat greater height above bed-plate 1 than is the cutting edge of blade 4, so that when they are closed up to said blade, as will be described, they extend above or lap the same. In the drawings two forms of the bearing-plates are shown. Bearing-plate 21 is constructed to simply move up flush with the cutting-blade, as shown at 23, Fig. 4, while bearing-plate 22 not only moves up to said cutting-blade, but it also has its edge adjacent thereto beveled and adapted to lap the cutting-blade, as seen at 24. In practice both bearing-plates of any one machine are of similar construction. The contours of the inner edges of the bearing-plates are similar to those of the adjacent sides, respectively, of the cutting-blade. The ends of the bearing-plates toward the end of the bed-plate where the pressure-roller is located extend beyond said bed-plate. There is on the under side of this extended end of bearing-plate 21 a depending lug 25 and on that of bearing-plate 22 a similar lug 26. The other ends of the bearing-plates do not extend to the edge of the bed-plate, but on their under sides are lugs 27, that pass through slots 28 in the bed-plate, which slots are seen in Fig. 2.

Beneath the front of the bed-plate and extending longitudinally thereof is a rock-shaft 29, and on this rock-shaft is a rearwardly-extending arm 30, journaled in hangers 39, connected by a rod 31 with a treadle 32. Connected with each end of rock-shaft 29 is an arm 33. The upper end of each arm 33 has a pivoted connection with one of the lugs 26 and 27, respectively, of bearing-plate 22. On lugs 34, depending from outwardly-extending brackets 35 on the bottom of exhaust-chamber 3, are fulcrumed levers 36, the lower and shorter arms whereof are connected with arms 33 by links 37, and the upper ends of levers 36 have pivoted connections with lugs 25 and 27, respectively, of bearing-plate 21. The openings 40 in lugs 25, 26, and 27, wherethrough arms 33 and levers 36 are pivoted thereto, are elongated vertically, as shown in Fig. 5. On rock-shaft 29 is coiled a spring 38, one end whereof is engaged with arm 30 of said rock-shaft and the other with the front rib of post 2 and which is normally adapted to hold bearing-plates 21 and 22 snugly up to cutting-blade 4.

When it is desired to cut a wrapper and roll the same around a bunch, the bearing-plates 21 and 22 are drawn back from cutting-blade 4 by pressure on treadle 32, when the wrapper is cut as before described. Pressure is then removed from treadle 32, and said bearing-plates are forced back against the cutting-blade by the action of the spring 38, coiled around rock-shaft 29.

I do not restrict myself to the details of construction herein shown and described, as it is obvious that many alterations may be made therein without departing from the principle and scope of my invention.

Having thus described my invention, what I claim as new, and desire to secure by Letters Patent, is—

1. The combination, in a cigar-wrapper-cutting machine, of a cutting-blade, a bearing-plate, and mechanism adapted to move the bearing-plate laterally toward and from said blade.

2. The combination, in a cigar-wrapper-cutting machine, of a cutting-blade, a bearing-plate extending above the cutting-blade, and mechanism adapted to move the bearing-plate laterally toward and from said blade.

3. The combination, in a cigar-wrapper-cutting machine, of a cutting-blade, a bearing-plate extending over the cutting-blade, and mechanism adapted to move the bearing-plate laterally toward and from said blade.

4. The combination, in a cigar-wrapper-cutting machine, of a cutting-blade, a bearing-plate extending above and over the cutting-blade, and mechanism adapted to move the bearing-plate laterally toward and from said blade.

5. The combination in a cigar-wrapper-cutting machine, of a cutting-blade, bearing-plates on opposite sides of the cutting-blade, and mechanism adapted to move the bearing-plates laterally toward and from said blade.

6. The combination, in a cigar-wrapper-cutting machine, of a cutting-blade, bearing-plates on opposite sides of the cutting-blade and extending above and over said cutting-blade, and mechanism adapted to move the bearing-plates laterally toward and from said blade.

7. The combination, in a cigar-wrapper-cutting machine, of a cutting-blade, a bearing-plate, a yielding device for normally holding the bearing-plate up to the cutting-blade, a rock-shaft, and connections between the rock-shaft and the bearing-plate, whereby the bearing-plate can be moved back from said blade.

8. The combination, in a cigar-wrapper-cutting machine, of a cutting-blade, bearing-plates on opposite sides of the cutting-blade and extending above the same, a yielding device for normally holding the bearing-plates up to the cutting-blade, a rock-shaft, and connections between the rock-shaft and the bearing-plates, whereby the bearing-plates can be moved back from said blade.

9. The combination, in a cigar-wrapper-cutting machine, of a cutting-blade, bearing-plates on opposite sides of the cutting-blade and extending above and over said cutting-blade, the rock-shaft, arm 30 on the rock-shaft, treadle 32, rod 31 connecting arm 30 and said treadle, spring 38 on the rock-shaft, arms 33 on the ends of the rock-shaft, levers 36, and links 37 connecting levers 36 and arms 33, substantially as and for the purpose specified.

JOHN A. PEEPELS.

Witnesses:
C. G. BASSLER,
WM. R. GERHART.